United States Patent
DiMarco et al.

(10) Patent No.: US 8,856,557 B2
(45) Date of Patent: Oct. 7, 2014

(54) DIGITAL POWER BALANCING CONTROLLER

(75) Inventors: Robert DiMarco, Poughkeepsie, NY (US); Randhir S. Malik, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 12/792,880

(22) Filed: Jun. 3, 2010

(65) Prior Publication Data

US 2011/0302440 A1    Dec. 8, 2011

(51) Int. Cl.
- *G06F 1/26* (2006.01)
- *G06F 1/00* (2006.01)
- *G06F 11/30* (2006.01)
- *G05F 1/70* (2006.01)
- *G05F 5/00* (2006.01)

(52) U.S. Cl.
CPC ..................... *G06F 1/26* (2013.01)
USPC ........... 713/300; 713/340; 323/205; 323/299; 323/371

(58) Field of Classification Search
CPC ............. G01R 19/10; G01R 19/16358; G01R 19/16547; H02M 3/33515; H02M 7/53803; H02M 2001/0003; H02M 2/1584; H02M 2/156; G05F 1/565; G05F 1/575; H02J 1/10; H02J 1/102; H02J 3/38; G06F 1/189; G06F 1/26; G06F 1/263
See application file for complete search history.

(56) References Cited

U.S. PATENT DOCUMENTS

| 4,453,122 A | 6/1984 | Johnson et al. |
| 4,618,779 A * | 10/1986 | Wiscombe ...................... 307/60 |

(Continued)

FOREIGN PATENT DOCUMENTS

| JP | 59224573 | 12/1984 |
| JP | 05292671 | 11/1993 |

OTHER PUBLICATIONS

Chattopadhyay, A Voltage-Sensorless Control Method to Balance the Input Currents of a Three-Wire-Boost Rectifier Under Unbalanced Input Voltages Condition, IEEE Transactions of Industrial Electronics, Apr. 2005, pp. 386-398, vol. 52, No. 2.

(Continued)

*Primary Examiner* — Tanh Nguyen
(74) *Attorney, Agent, or Firm* — Kunzler Law Group; Steven L. Bennett

(57) ABSTRACT

An apparatus, system, and method are disclosed for providing power balancing for power supplies. A power module measures an amount of input power for each of a plurality of switching power supplies. A conversion module converts the measured amount of input power of each power supply to a digital power measurement signal. An averaging module determines an average amount of input power per power supply based on a summation of the digital power measurement signal of each power supply. A comparison module compares the digital power measurement signal of a power supply to the determined average amount of input power per power supply. An input power adjustment module adjusts the input power of the power supply to cause the amount of input power of the power supply to be substantially equal to the determined average amount of input power per power supply.

15 Claims, 6 Drawing Sheets

(56) References Cited

U.S. PATENT DOCUMENTS

| | | | |
|---|---|---|---|
| 5,212,407 A | 5/1993 | Gaddis et al. | |
| 5,319,536 A * | 6/1994 | Malik | 363/65 |
| 6,018,203 A | 1/2000 | David et al. | |
| 6,157,555 A * | 12/2000 | Hemena et al. | 363/71 |
| 6,320,771 B1 * | 11/2001 | Hemena et al. | 363/70 |
| 7,518,264 B1 * | 4/2009 | Malik et al. | 307/43 |
| 2003/0128563 A1 | 7/2003 | Rojas Romero | |
| 2005/0036248 A1 | 2/2005 | Klikie et al. | |
| 2009/0122582 A1 | 5/2009 | Ye et al. | |
| 2009/0174393 A1 * | 7/2009 | Dishman et al. | 324/114 |
| 2011/0302440 A1 * | 12/2011 | DiMarco et al. | 713/340 |

OTHER PUBLICATIONS

Greul, Analysis and Control of a Three-Phase, Unity Power Factor Y-Rectifier, IEEE Transactions of Power Electronics, Sep. 2007, pp. 1900-1911, vol. 22, No. 5.

Li Shao-Long, An Improved and Digital Current Control Strategy for One Cycle Control Based Three-Phase Boost Rectifier under Unbalanced System, College of Electrical Engineering, University of Shanghai for Science and Technology, IPEMC 2006, China, Downloaded on Nov. 10, 2009 from IEEE Xplore.

* cited by examiner

DIGITAL POWER BALANCING CONTROLLER

FIELD

The subject matter disclosed herein relates to power supplies and more particularly relates to using digital signals to perform power balancing operations on power supplies. The subject matter also relates to improving the efficiency of power supplies that utilize a three-phase power source.

BACKGROUND

Description of the Related Art

A power supply, sometimes known as a power supply unit or PSU, is a device or system that supplies electrical or other types of energy to an output load or group of loads. A power supply, in some embodiments may be configured to convert power in one form to another form, such as converting alternating current ("AC") power to direct current ("DC") power. The regulation of power supplies is typically done by incorporating circuitry to tightly control the output voltage or current of the power supply to a specific value. In a switching power supply, regulation is often performed by controlling a duty cycle of a switch by turning the switch on and off to maintain a desired output voltage or current. The specific output value is typically closely maintained despite variations in the load presented to the power supply's output, or voltage variation at the power supply's input within a specified range.

For example, in an electronic device such as a computer, the power supply is typically designed to convert an AC voltage input such as is traditionally provided by a conventional wall socket, into several low-voltage DC power outputs for transmission to the internal components of the computer. Conversion is sometimes performed in stages that may include different power supply topologies such as a rectification stage, a boost stage, buck stage, or other topology.

When several power supplies share a common load, it may be desirable to ensure that the common load is shared equally among the power supplies. In some instances, a three-phase AC input power system may provide power to the power supplies where each power supply utilizes power from a distinct phase of the three-phase power signal. However, conventional power balancing techniques are unable to provide cheap and effective tools for proper load balancing, particularly load balancing between the three phases of a three-phase AC power source. A mismatch in load balancing between phases may result in underutilization of the power source capacity and may also cause an undesirable neutral current flow.

BRIEF SUMMARY

From the foregoing discussion, it should be apparent that a need exists for an apparatus, system, and method that cheaply and efficiently provide proper load balancing between power supplies that share a common load. Beneficially, such an apparatus, system, and method would resolve the problems in the prior art by utilizing digital power measurement calculations to adjust the amount of input power used by each power supply. The amount of total power used by the power supplies may be equally balanced between each individual power supply or between each phase of a three-phase AC power source.

The present invention has been developed in response to the present state of the art, and in particular, in response to the problems and needs in the art that have not yet been fully solved by currently available power supplies. Accordingly, the present invention has been developed to provide an apparatus, system, and method for balancing power among power supplies that overcome many or all of the above-discussed shortcomings in the art.

The apparatus to perform power balancing of power supplies is provided with a plurality of modules and stages. These modules and stages in the described embodiments include a power module, a conversion module, an averaging module, a comparison module, and an input power adjustment module.

In one embodiment, the power module measures an amount of input power for each of several switching power supplies. The conversion module converts the measured amount of input power of each power supply to a digital power measurement signal. The averaging module determines an average amount of input power per power supply based on a summation of the digital power measurement signal of each power supply. The comparison module compares the digital power measurement signal of a power supply to the determined average amount of input power per power supply. The input power adjustment module adjusts the input power of the power supply to cause the amount of input power of the power supply to be substantially equal to the determined average amount of input power per power supply.

In one alternate embodiment of the apparatus, the power module measures an amount of input power for each of several switching power supplies, where each of the switching power supplies provides power to a common load. In this embodiment, each of the power supplies may also receive power from a three-phase AC power source. Each phase of the AC power source may supply power to at least one of the power supplies.

The conversion module converts the measured amount of input power of each power supply to a digital power measurement signal. The averaging module determines an average amount of input power per power supply based on a summation of the digital power measurement signal of each power supply. The comparison module compares the digital power measurement signal of a power supply to the determined average amount of input power per power supply.

In a further embodiment of the apparatus, the input power adjustment module adjusts the input power of the power supply to cause the amount of input power of the power supply to be substantially equal to the determined average amount of input power per power supply by adjusting a voltage reference signal used by a regulation feedback loop of the power supply to regulate an output voltage of the power supply.

A system of the present invention is also presented to perform power balancing of power supplies. The system in the disclosed embodiments substantially includes the elements necessary to carry out the functions and operations described above with regard to the apparatus. In particular, the system, in one embodiment, includes a plurality of switching power supplies and a power balancing apparatus as described above including the power module, conversion module, averaging module, comparison module, and input power adjustment module in the various disclosed embodiments and configurations.

A method of the present invention is also presented for providing power balancing of power supplies. The method in the disclosed embodiments substantially includes the steps necessary to carry out the functions presented above with respect to the operation of the described apparatus and system. In one embodiment, the method includes measuring an amount of input power for each of several switching power supplies and converting the measured amount of input power of each power supply to a digital power measurement signal. The method also may include determining an average amount of input power per power supply based on a summation of the digital power measurement signal of each power supply. In one embodiment, the method includes comparing the digital power measurement signal of a power supply to the determined average amount of input power per power supply. In a further embodiment, the method includes adjusting the input power of the power supply to cause the amount of input power of the power supply to be substantially equal to the determined average amount of input power per power supply.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
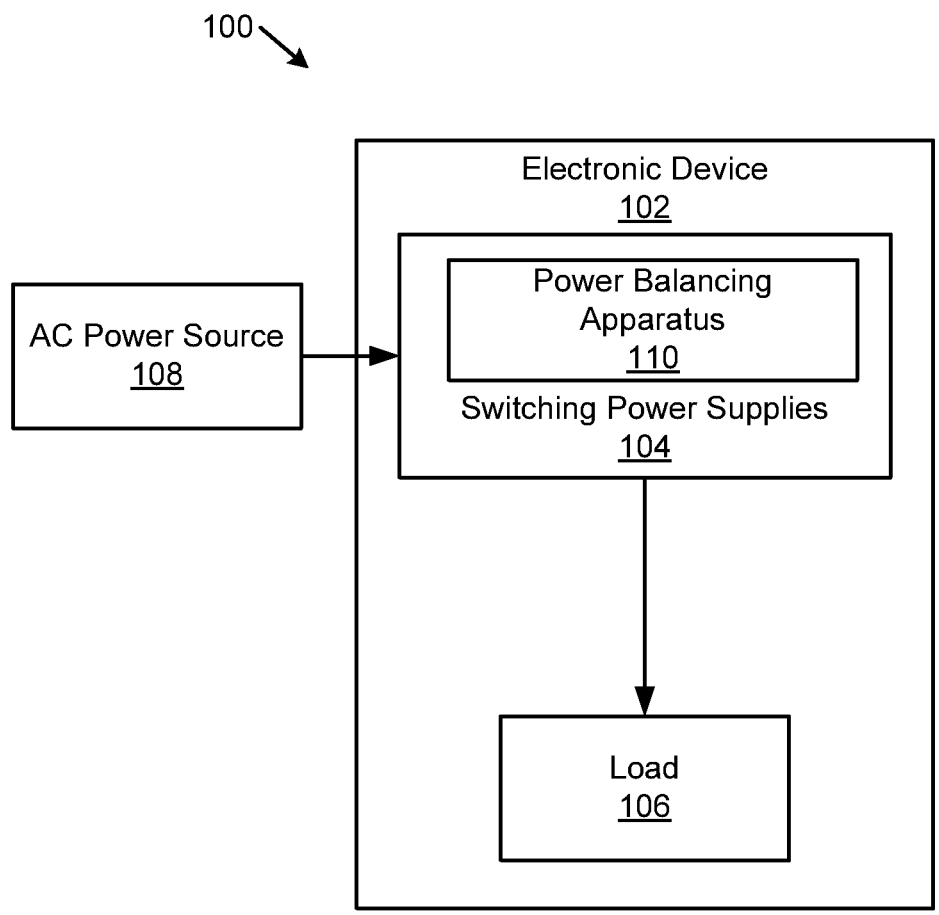
FIG. 1 is a schematic block diagram illustrating one embodiment of a system for providing power balancing of power supplies in accordance with the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory ("RAM"), a read-only memory ("ROM"), an erasable programmable read-only memory ("EPROM" or Flash memory), a portable compact disc read-only memory ("CD-ROM"), a digital versatile disc ("DVD"), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency ("RF"), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic block diagram illustrating one embodiment of a system 100 for providing power balancing of power supplies in accordance with the present invention. In the depicted embodiment, the system 100 includes an electronic device 102, two or more switching power supplies 104, and a load 106. The system also includes an alternating current ("AC") power source 108 and a power balancing apparatus 110.

In one embodiment, the power supplies 104 provide regulated power to the electronic device 102 in order to power various electronic systems and subsystems within the electronic device 102. The power supplies 104 are typically connected to the electronic device 102 by a regulated bus, cable, circuit board, or the like. The power supplies 104 may be configured to provide one or more different voltages and currents to the electronic device 102. For example, in a typical computer power supply, voltages of +12 V, +5 V, +3.3 V, and −12 V are commonly provided.

The power supplies 104 may include different functionalities and topologies. As will be recognized by those of skill in the art, typical topologies may include rectification, boost, buck, or other topologies necessary to regulate and provide power to the electronic device 102. Each power supply 104 may include various stages that combine one or more of these topologies in order provide one or more desired output voltages to the electronic device 102. The various stages of the power supply 104 allow the power supply 102 or stages within the power supply 102 to perform different functions such as rectification, voltage or current conversion, frequency changing, inversion, etc.

In one embodiment, the powers supplies 104 are switching power supplies. A switching power supply, or switched-mode power supply, is typically a power supply that incorporates a switching regulator in order to provide a required output voltage or current. Regulation is performed by controlling a duty cycle of a switch by turning the switch on and off to maintain a desired output voltage or current. In a switching power supply, one or more stages of the power supply may include a switching regulator. In a common configuration, a switching power supply includes a primary stage and a secondary stage. The primary stage typically receives a rectified incoming AC voltage signal from a rectification stage and uses a switching regulator to regulate a direct current ("DC") output voltage that is provided from the primary stage to one or more secondary stages. The primary stage may modify an input current to be in phase with the rectified input voltage for power factor correction. In one embodiment, the secondary stage may also include a switching regulator that further converts the DC output voltage from the primary stage into one or more different voltages.

In various embodiments, the electronic device 102 may be a computer system, such as a blade, a desktop computer, a laptop computer, a server, etc., and the power supplies 104 may be configured to provide power to the various components of the computer system. In other embodiments, the electronic device 102 may include devices such as routers, switches, personal digital assistants ("PDAs"), displays, appliances or other electronic devices as recognized by one of skill in the art. In one embodiment, the power supplies 104 may be implemented within the same enclosure as the electronic device 102, such as within a computer tower case. In other embodiments, the power supplies 104 may be implemented external to the electronic device 102 and may be connected to the electronic device 102 via a connection means such as a cord, cable, or bus such as in a blade center.

The switching power supplies 104 typically receive power from a power source 108 such as a conventional wall socket outlet, a power utility, a generator, a battery or the like. In one embodiment, the switching power supplies 104 receive power from an AC power source 108 that provides an AC power signal to the power supplies 104. In some embodiments, the AC power signal may be provided with a plurality of phases, such as in a three-phase AC power signal, in order to increase efficiency or lower cost. A three-phase AC signal typically utilizes three circuit conductors that carry three alternating currents of the same frequency where each phase is offset by 120 degrees. The different alternating currents reach their peak values at different times, typically divided by thirds throughout each cycle. Other poly-phase AC signals are also contemplated in accordance with this invention.

A three-phase AC power source 108 may be connected to the power supplies 104 in various configurations. In one embodiment, the three-phase AC power source 108 may be connected to the power supplies 104 in a three or four wire, wye configuration. A four wire, wye configuration, as will be recognized by those of skill in the art is a configuration with three line-voltage wires, one for each phase, and a neutral wire. In another embodiment, the three-phase AC power source 108 may be connected to the power supplies 104 in a delta configuration. In a delta configuration, a neutral wire or "common" is not typically provided. A delta-configured AC power source 108 typically connects to three-phase balanced loads or a delta connected load.

The electronic device 102 causes a load 106 to be applied to the power supplies 104. The amount of load 106 may affect the performance of the power supplies 104. The power supplies 104 are typically configured to operate efficiently in conjunction with a specified load 106. In one embodiment, the load 106 may vary depending on the operation characteristics of the electronic device 102, and the power supplies 104 may be configured to adjust accordingly. For example, a power supply 104 may include a feedback signal for adjusting the power output characteristics of the power supply 104 in response to changes in the load 106. Typically, the power supply 104 regulates the voltage on a regulated bus so as to provide substantially constant voltage levels to the electronic device 102 under varying load conditions.

In one embodiment, a common load 106 is shared between a plurality of power supplies 104. In this case, it may be desirable to share the load 106 equally among the power supplies 102 in order to increase efficiency. The power balancing apparatus 110, as described in detail below, operates to economically and efficiently adjust the amount of input power used by each power supply 104 such that the load 106 is shared equally or nearly equally among the power supplies 104. In an embodiment in which the AC power source 108 provides a poly-phase AC power signal to the power supplies 104, such as a three-phase AC power signal, the power balancing apparatus 110 operates to distribute the load 106 between each phase of the AC power signal by adjusting the amount of input power consumed by each power supply 104.

Load balancing between each phase of the AC power signal is advantageous, because it presents a balanced load to the AC power source 108, thus having lower harmonics and a higher power factor than an unbalanced load. A balanced source allows wiring and equipment upstream of the electronic device 102 to be sized to match the balanced load more closely instead of being oversized to account for load imbalances and harmonics. In addition, a power utility presented with high power factor load from a customer typically charges a lower rate than a customer with a load that has a low power factor.

Figure 2:
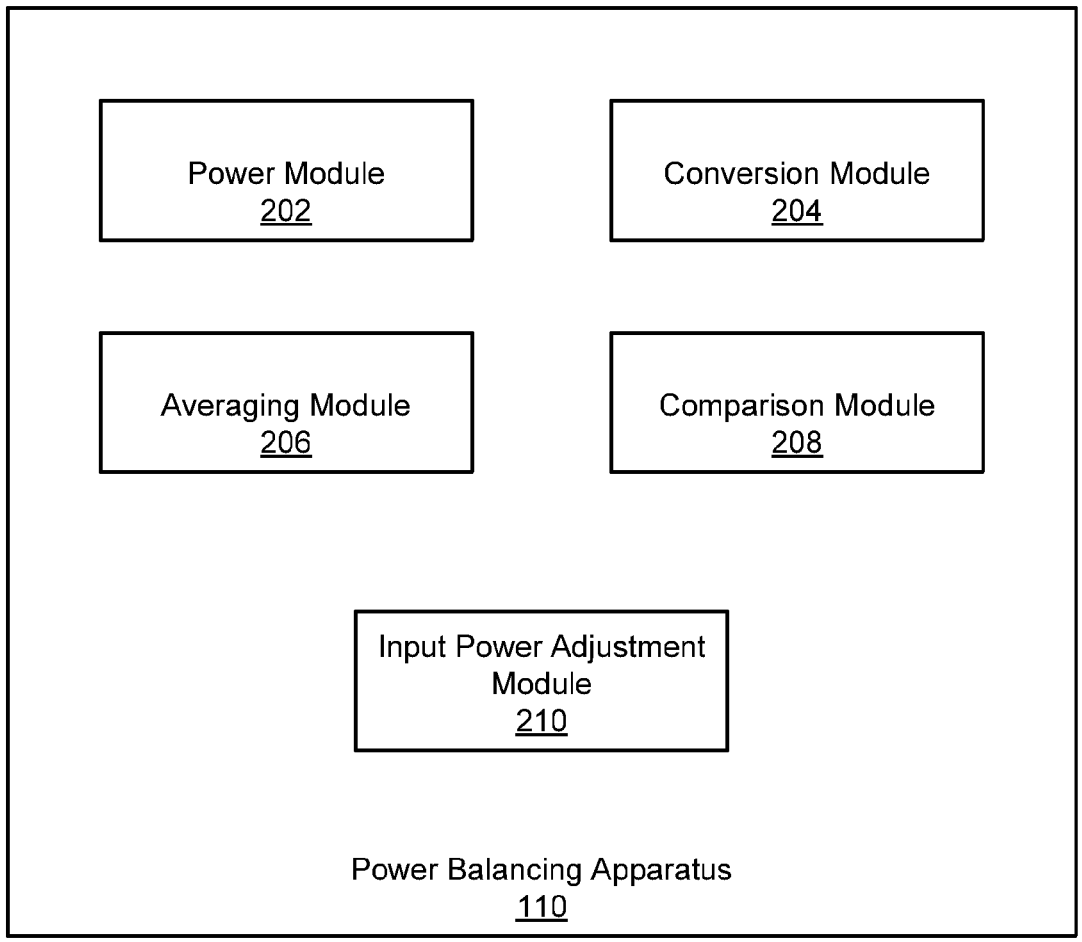
FIG. 2 is a schematic block diagram illustrating one embodiment of a power balancing apparatus for providing power balancing of power supplies in accordance with the present invention.

FIG. 2 is a schematic block diagram illustrating one embodiment of a power balancing apparatus 110 for providing power balancing of power supplies 104 in accordance with the present invention. The power balancing apparatus in the depicted embodiment includes a power module 202, a conversion module 204, an averaging module 206, a comparison module 208, and an input power adjustment module 210, which are described below.

In one embodiment, the power module 202 measures an amount of input power for each of a plurality of switching power supplies 104. Measurement of input power is typically done by monitoring current and/or voltage on an input line to each power supply 104. Sensors or other devices may be used to monitor and measure voltage and/or current on a node in the power path of each power supply 104. As will be recognized by those of skill in the art, power equals current times voltage (or current times voltage times a scaling factor if measuring root-mean-square ("RMS") or three-phase power). Current may be measured using a current transformer, hall-effect sensor, voltage across an impedance (such as a resistor), etc. Power may be derived from current and voltage measurements or may be derived from one or more current measurements if a voltage is assumed constant. Power may be measured instantaneously or averaged over a period. In some embodiments, the power module 202 measures the input power of a power supply 104 by measuring an amount of input power during some period of time, such as during one or more cycles of an AC input power signal.

In some power supplies 104, the input power may be determined and used for other purposes such as efficiency regulation or shutdown thresholds, in which case, the power module 202 may "measure" an amount of input power by retrieving the amount of input power for the power supply 104 from a power meter or power monitor provided with the power supply 104. In one embodiment, each power supply 104 may include a rectifier stage that rectifies an AC power signal received from a power source 108. In such an embodiment, the input power may be measured at the input of the rectification stage of each power supply 104. Of course, in other embodiments, it is contemplated that input power may be measured or monitored at other nodes and stages of a power supply 104 to determine an amount of input power consumed by the power supply 104.

In one embodiment, the power module 202 includes input power sensors. In another embodiment, the power module 202 receives a power measurement from one or more sensors used for a different purpose. Typically the power module 202 measures input power to the switching power supplies 104. Input power may be measured, in one embodiment, at or near a connection point to the AC power source 108. In other embodiments, input power may be measured after a rectification stage or at some other location within the switching power supplies 104. Where power is measured at a point different than an input to the switching power supplies 104, a correction factor may be used to account for power loss in components ahead of a point where power is measured. One of skill in the art will recognize other ways to measure input power.

In one embodiment, the conversion module 204 converts the measured amount of input power of each power supply 104 to a digital power measurement signal. Typically, the input power of a power supply 104 is measured using analog sensors or the like that provide an analog measurement signal indicating an amount of power. An analog-to-digital converter may be used to convert the analog signal to a digital power measurement signal made of digital bits that represent the measured amount of input power for a power supply 104. In one embodiment, the conversion module 204 may be integrated with the power module 202 such that the power measurement is immediately provided in digital form, such as a signal provided by a digital sensor or meter.

In one embodiment, the digital measurement signal is provided with a sufficient number of bits to ensure sufficient granularity with respect to the measured input power. By converting the measured input power into a digital signal, the system 100 may be able to more economically and efficiently perform logic operations such as summing, averaging, and subtraction on the digital measurement signal. Depending on the properties of the system 100 such as line impedance, source impedance, and other power characteristics, the digital measurement signal should be selected to ensure that adjustments made to the power supplies 104 based on the digital signal operate within acceptable specifications of the power supplies 104.

For example, the power supplies 104 may tolerate only very small adjustments in voltage, current, or power, and the number of bits of the digital measurement signal may be selected to ensure that the digital signal can represent and propagate very small changes in the controls or power characteristics of the power supplies 104. If the granularity of the digital signal is not fine enough, adjustments to a power supply 104 based on the digital signal may fail to properly balance the load 106 between the power supplies 104 or may even cause power supply failures. In one embodiment, the digital power measurement signal is comprised of a number of bits in the range of about eight bits to about thirty-two bits. Of course, digital signals with fewer or more bits are also contemplated depending on the specifications of the system 100.

In one embodiment, the averaging module 206 determines an average amount of input power per power supply of the power supplies 104 based on a summation of the digital power measurement signal determined for each power supply. In other embodiments, the averaging module 206 determines and average amount of input power using another method, such as comparing the input power of a power supply 104 to a reference or constant or to the input power of the other power supplies 104 and using a difference between the reference or constant or other input power to determine an average amount of power. Thus, the power module 202 measures the input power of each power supply 104, the conversion module 204 converts the measured input power of each power supply 104 to a digital power measurement signal, and the averaging module 206 determines an average amount of input power used by each power supply 104. In one embodiment, the averaging module 206 determines an average amount of input power by dividing the summation of the digital power measurement signal of each power supply 104 by the number of power supplies 104. Because the power measurement signals are in digital form, mathematical operations such as summation, division and subtraction may be accomplished either by software modules, hardware modules, or a combination of the two.

In one embodiment, the comparison module 208 compares the digital power measurement signal of each power supply 104 to the determined average amount of input power per power supply 104. In a power balanced system, the input power of each power supply 104 will match the average amount of input power per power supply 104. The comparison module 208 may perform the comparison using tools such as a bit comparator or by using other digital comparison techniques as recognized by those of skill in the art. In one embodiment, the comparison module 208 compares the digital power measurement signal of each power supply 104 to the determined average amount of input power per power supply 104 by subtracting the digital power measurement signal of the power supply 104 from the determined average amount of input power per supply 104. The difference between a power supply's digital power measurement signal and the average determines whether and how much adjustment needs to be made to the input power of each power supply 104 in order to balance the load 106 between the power supplies 104.

In one embodiment, the input power adjustment module 210 adjusts the input power of each power supply 104 to cause the amount of input power of each power supply 104 to be substantially equal to the determined average amount of input power per power supply 104. By making the input power of each power supply 104 substantially equal to the average, the load 106 is effectively balanced between each of the power supplies 104. The input power of each power supply 104 is typically adjusted by adjusting a control signal that controls operation of a power supply 104. For example, an output voltage or current may adjusted to change the amount of input power used by a power supply 102. In one embodiment, adjusting a voltage or current of a power supply 104 may include providing or adjusting a control signal or regulation signal of the power supply 104.

In one embodiment, such as in a power supply 104 with a rectifier and a switching regulation stage with a feedback loop that regulates an output voltage of the power supply 104, a voltage reference signal may be used by the feedback loop to regulate the output voltage. Typically, the voltage reference signal is a voltage that is compared to an output voltage of a switching regulator. The switching regulator stage is typically controlled so that the output voltage of the switching regulator is adjusted to match the voltage reference signal. In one embodiment, the input power adjustment module 210 adjusts the input power of the power supply by adjusting the voltage reference signal used by the feedback control loop of a switching regulator or other type of regulator. In some cases, the adjustments to an output voltage or voltage reference signal may be very small such as hundredths, thousandths, or smaller fractions of a volt. In other embodiments, the input power adjustment module 210 adjusts the input power of each switching power supply 104 using another method, such as adjusting a duty cycle, an on-time of a switch, or other means known to those of skill in the art.

Note that typically the input power adjustment module 210 adjusts the input power of each switching power supply 104 at a rate much slower than stages within the power supplies 104 regulate voltage within the switching power supplies 104. The power module 202, the conversion module 204, the averaging module 206, the comparison module 208, and the input power adjustment module 210 may form a feedback loop and typically this feedback loop is slower than feedback loops within the switching power supplies 104. In addition, it is typically desirable for the feedback loop of the power balancing apparatus 110 to be slow enough not to reach to voltage changes due to the sinusoidal nature of the AC power source 108. Typically the power balancing apparatus 110 adjusts input power over several cycles of an AC waveform period. In one embodiment, the power balancing apparatus 110 adjusts input power over two or more cycles of an AC waveform period of the AC power source 108.

Figure 3:
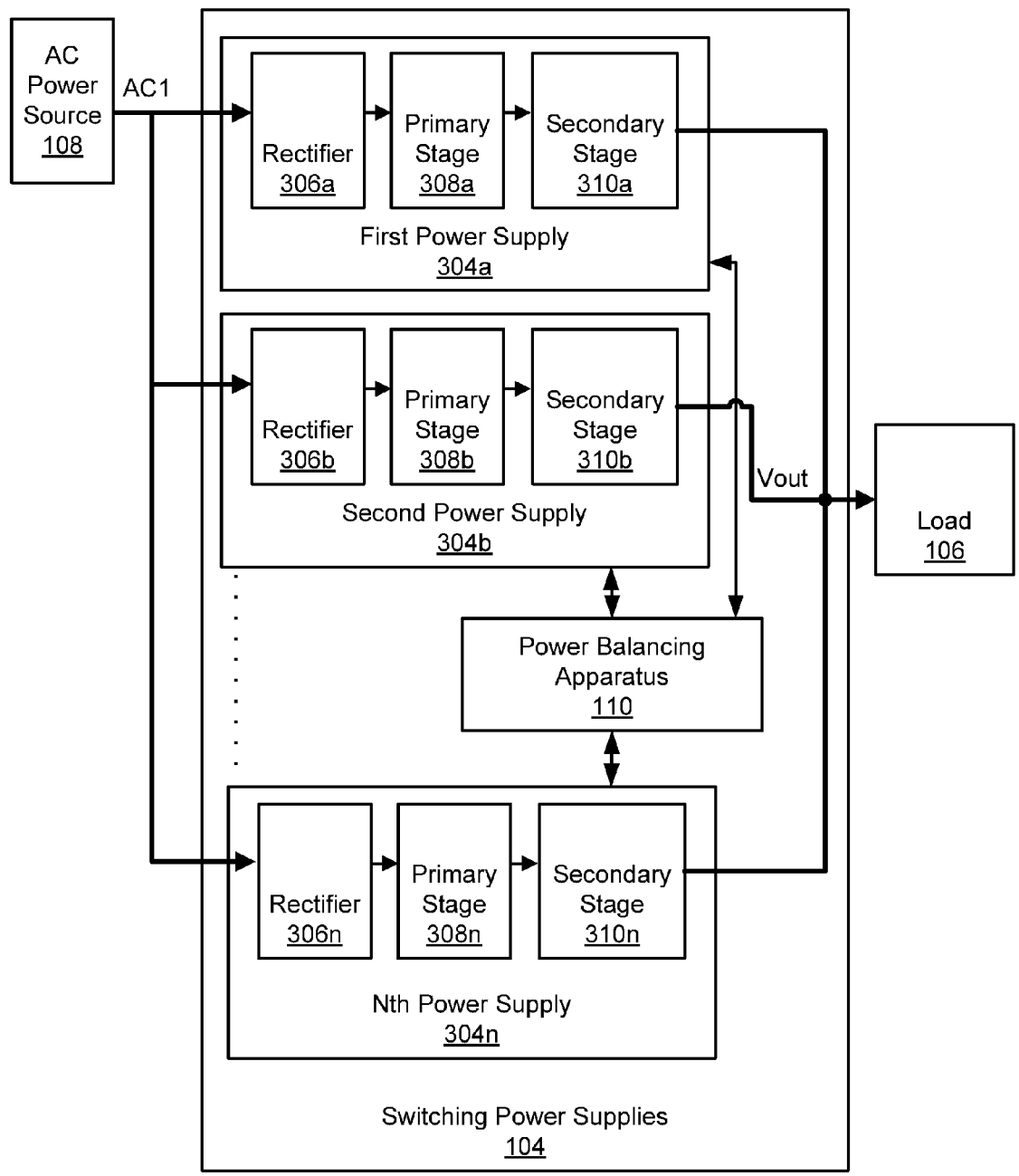
FIG. 3 is a schematic block diagram illustrating a further embodiment of a system for providing power balancing of power supplies in accordance with the present invention.

FIG. 3 is a schematic block diagram illustrating a further embodiment of the system 100 for providing power balancing of power supplies 104 in accordance with the present invention. As depicted, the system 300 includes 'N' number of switching power supplies 104 including a first power supply 304a, a second power supply 304b, and an Nth power supply 304n.

As depicted, each of the power supplies 304a-n receives an AC power signal AC1 from a power source 108. In other embodiments, the n power supplies 304 may receive power from phases of a three-phase AC power source 108. The power supplies 304a-n share a common load 106, and provide power to the load 106 via a common node Vout. In one embodiment, the common output node Vout shared by the power supplies 304a-n includes a diode (not pictured) between each of the power supplies 304a-n and the load 106. The diodes help to ensure that current flows only from a power supply 304a to the load 106 even in the event of a failure of another power supply 304b. In further embodiments, additional protection mechanisms and devices may also be used to isolate each power supply 304a-n from the other power supplies 304a-n in the event of failures, power surges, or the like.

In the depicted embodiment, each of the power supplies 304a-n includes a rectifier 306a-n, a primary stage 308a-n, and one or more secondary stages 310a-n. This is one common configuration of a power supply 304a-n in accordance with the present invention. (Note that each power supply 304 may include one or more secondary power stages 310 (not shown) and each secondary power stage 310 may supply a different output voltage. Each secondary power stage 310 may be connected with a secondary stage 310 of a different power supply 304 that has a same output voltage.) Of course other configurations, including different stages and a different number of stages, are contemplated as will be recognized by one of skill in the art. The AC power signal AC1 is received by each rectifier 306a-n and is rectified by the corresponding rectifier 306a-n. Rectification is the process of converting an AC signal to a DC signal. One of skill in the art will recognize that rectification may include half-wave rectification, full-wave rectification, or other types of rectification known in the art.

In the depicted embodiment, the rectified AC power signal AC1 is passed to the primary stage 308a-n which typically performs a power conversion such as a voltage boost and regulates an intermediate output voltage. In other embodiments, the power supplies 304 include a rectifier stage 306 and a single stage that receives a rectified voltage from the rectifier stage 306 and provides a regulated output voltage Vout. The primary stage 308a-n may be a switching regulation stage with or without a feedback loop that regulates an intermediate voltage between the primary stage 308a-n and the one or more secondary stages 310a-n. Common primary stages 308a-n and secondary stages 310a-n include boost stages, buck stages, boost-buck stages, or the like as recognized by those of skill in the art. The primary stage 308a-n and the one or more secondary stages 310a-n are typically comprised of electronic components such as capacitors, diodes, inductors, switches, transformers, etc. In a switching regulator stage, a switch is turned on and off to regulate a voltage at the output of the stage.

In the depicted embodiment, the one or more secondary stages 310a-n receive a converted voltage from the primary stage 308a-n and convert the voltage into useable DC voltages that are provided to the load 106. Like the primary stage 308a-n, the secondary stage 310a-n may be a switching regulation stage with or without a feedback loop that regulates an output voltage Vout. In one embodiment, the secondary stages 310a-n may have several feedback loops and regulation mechanisms, such as switches, for regulating a plurality of output voltages of the various secondary stages 310a-n.

As described above, the modules 202-210 of the power balancing apparatus 110 monitor the input power of each power supply 304*a-n* and adjust the input power of each power supply 304*a-n* to cause the amount of input power of each power supply 304*a-n* to be substantially equal to a determined average amount of input power per power supply, as described in FIG. 2. In one embodiment, adjusting the input power of a power supply 304*a-n* may include adjusting a voltage reference signal or other control signal associated with the power supply 304*a-n*. In one embodiment, the voltage reference signal may correspond to a feedback loop in either the primary stage 308*a-n* or the one or more secondary stages 310*a-n*.

Typically the input power adjustment module 210 adjusts a voltage reference signal for a feedback loop that controls output voltage of the power supply 304. In one embodiment, the input power adjustment module 210 adjusts a voltage reference signal of a feedback loop of a secondary power stage 310. In another embodiment, the input power adjustment module 210 adjusts a voltage reference signal of a feedback loop of the primary power stage 308. In this embodiment typically the one or more secondary power stages 310*a-n* are unregulated so that adjustment of the voltage reference signal of the primary stage 308 will affect output voltage of the one or more secondary power stages 310.

In an embodiment where two or more power supplies 304 are connected to a phase of the AC power source 108, the power balancing apparatus 110 balances power such that each of the two or more power supplies 304 use an approximately an equal amount of power. In another embodiment where the AC power source 108 is a multiple phase power supply, the power supplies 304 may be divided with an equal number of power supplies 304 per phase.

Other configurations are also possible, such as an embodiment where the power supplies 304 are sized differently. For example, one power supply 304*a* may be connected to a phase and sized to be twice as large as the other power supplies 304*b-n* connected to other phases so the other power supplies 304*b-n* may be combined to match the power output of the larger power supply 304*a*. For example, the first power supply 304*a* may be connected to phase A, a second and a third power supply 304*b*, 304*c* may be connected to phase B, and a fourth and a fifth power supply 304*d*, 304*e* may be connected to phase C and the power balancing apparatus 110 may balance power for each phase. One of skill in the art will recognize other combinations of power supplies 304 to balance.

Figure 4:
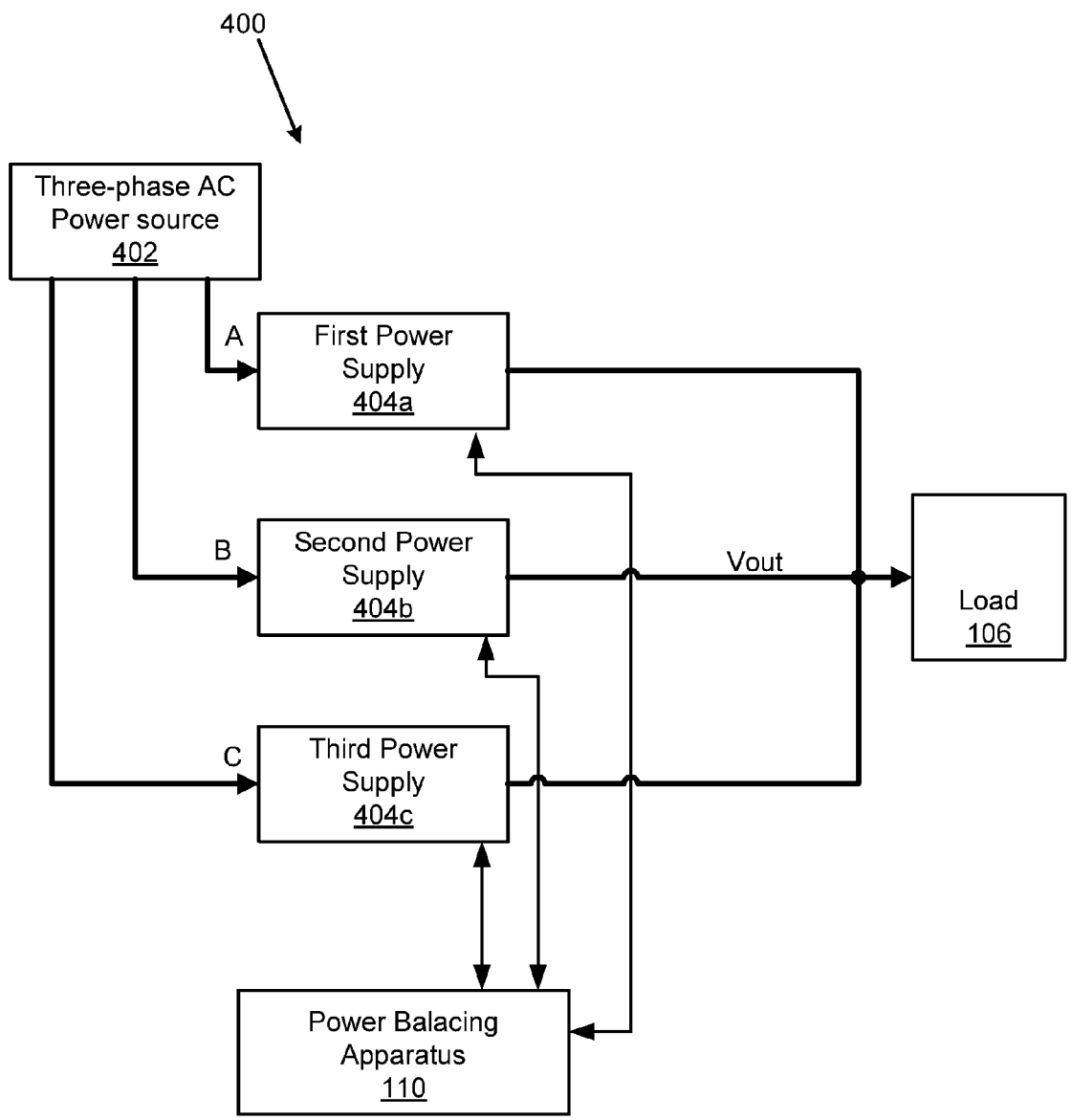
FIG. 4 is a schematic block diagram illustrating an embodiment of a three-phase power source and power balancing system.

FIG. 4 is a schematic block diagram illustrating an embodiment of power balancing system 400 with a three-phase AC power source 402 in accordance with the present invention. The system 400 includes a three-phase power source 402, a first power supply 404*a*, a second power supply 404*b*, and a third power supply 404*c*. As depicted, the three-phase AC power source 402 provides power to the first, second, and third power supplies 404*a-c* by using one of three phases A-C to power one of the corresponding power supplies 404*a-c*. In the depicted embodiment, the power supplies 404*a-c* share a common load 106. Each power supply 404 may include a rectifier stage 306 and one or more other stages 308, 310, substantially as described in relation to FIG. 3. The power balancing apparatus 110 includes at least a power module 202, a conversion module 204, an averaging module 206, a comparison module 208, and an input power adjustment module 210 substantially similar to those described in relation to FIG. 2.

In one embodiment, each phase A-C of the three-phase AC power source supplies power to at least one of the power supplies 404*a-c*. In a further embodiment, each power supply 404*a-c* receives power from a distinct phase A-C of the three-phase AC power source 402. In some embodiments, each phase A-C may provide power to more than one power supply 104. For example, each of the first, second, and third power supplies 404*a-c* may each be comprised of two or more redundant power supplies. In a further embodiment, exactly three power supplies 404*a-c* may be provided, each distinct power supply 404*a-c* receives power from a single distinct phase A-C of the three-phase AC power source 402.

In one embodiment, the power supplies 404 are connected to the three-phase AC power source 402 in a four-wire wye configuration. In this configuration, typically each power supply 404*a-c* connects to a phase and to a neutral of the three-phase AC power source 402. In another embodiment, the power supplies 404 are connected to the three-phase AC power source 402 in a delta configuration. In this delta configuration each power supply 404 connects to two phases of the three-phase AC power source 402. For example, the first power supply 404*a* may be connected to phases A and B, the second power supply 404*b* may be connected to phases B and C, and the third power supply 404*c* may be connected to phases A and C.

The modules 202-210 of the power balancing apparatus 110 operate to balance the load between each phase A-C of the AC power signal provided by the three-phase AC power source 402. As described above, this is accomplished by the input power adjustment module 210 adjusting the input power of the power supplies 404*a-c* so that the amount of power supplied by each phase A-C is substantially equal. In one embodiment, the averaging module 206 uses digital power measurement signals to determine an average amount of power used per power supply 404*a-c*, then the input power adjustment module 210 adjusts the input power of each power supply 404*a-c* to match the determined average. If more than one power supply 404*a* is powered by a single phase A, then additional calculations may be made to determine an average amount of power per phase, rather than an average amount of power per power supply 404*a-c*.

For example, the input power provided by a single phase A may be shared by two or more power supplies 404*a*, 404*aa* (not pictured). In which case the total input power used by both power supplies 404*a*, 404*aa* receiving power from the single phase A may be adjusted to match an average amount of power per phase, instead of an average amount of power per power supply 404*a-c*. However, where the number of power supplies 404*a-c* match the number of phases A-C, and where each distinct phase A-C provides power to a single power supply 404*a-c*, then a measurement of the input power for each power supply 404*a-c* and a determination of an average amount of input power per power supply 404 is sufficient.

Figure 5:
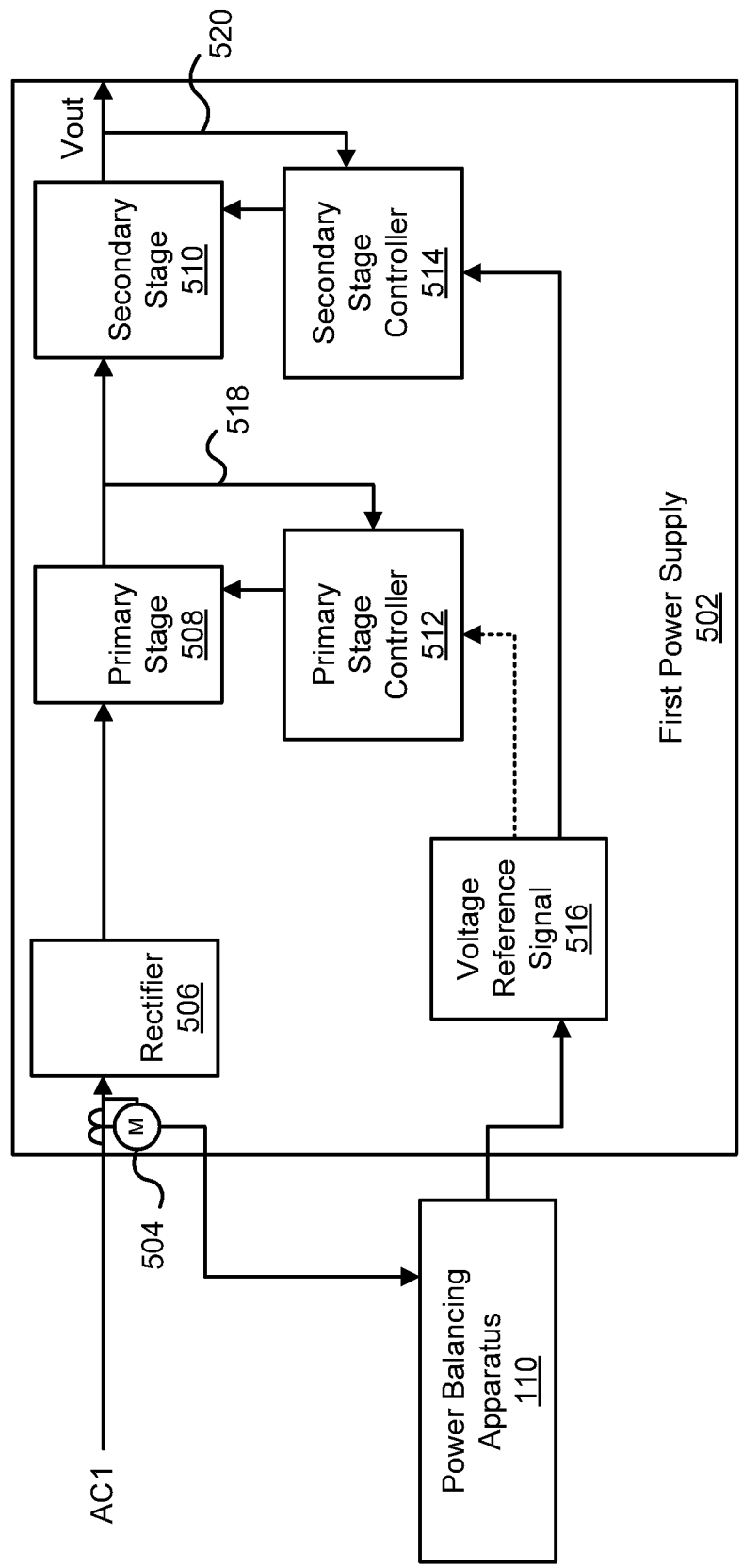
FIG. 5 is a schematic block diagram illustrating an embodiment of a switching power supply and power balancing apparatus in accordance with the present invention.

FIG. 5 is a schematic block diagram illustrating an embodiment of a switching power supply 502 and power balancing apparatus 110 in accordance with the present invention. The power supply 502 includes a power meter 504, a rectifier 506, a primary stage 508, and a secondary stage 510. The power supply 502 also includes a primary stage controller 512, a secondary stage control 514, and a voltage reference signal 516.

The primary stage controller 512 operates to regulate an output voltage of the primary stage 508. The primary stage controller 512 receives a feedback signal from the output of the primary stage 508. In one embodiment, the primary stage controller compares the feedback signal 518 to a voltage reference signal 516 to adjust the output voltage of the primary stage 508. Typically, in a switching regulator, a duty cycle of a switch is controlled to cause the output voltage 518 to substantially match the voltage reference signal 516.

Similarly, the secondary stage controller 514 operates to regulate an output voltage of the secondary stage 510. The secondary stage controller 514 receives a feedback signal 520 from the secondary stage 510, and compares the feedback signal 520 to a voltage reference signal 516 to determine how to adjust the output voltage of the secondary stage 510. In some embodiments only the primary stage 508 or only the secondary stage 510 includes a feedback signal and stage controller 512, 514. For example, the secondary stage 510 may be operated in an open loop, fixed-duty cycle mode where regulation of the primary stage 508 also regulates the output of the secondary stage 510 based on the open loop operation of the second stage 510. In another embodiment, the primary stage controller 512 and secondary stage controller 514 are combined into a single controller.

In other embodiments, both the primary stage 508 and secondary stage 510 include feedback loops and utilize distinct voltage reference signals. However, in some configurations where the stage controllers 512, 514 are used to change the input power of the power supply 502, it may be desirable or necessary to use adjust the output voltage of only the primary stage 508 or only the secondary stage 510 in order to effect the desired change in input power. For example, if both the primary stage 508 and secondary stage 510 operate in a closed loop mode, adjustment of the voltage reference signal 516 of the primary stage controller 512 may change the power characteristics of the primary stage 508, but the secondary stage controller 514 may then adjust its power characteristics to compensate for the change in the output of the primary stage 508. Such operation may make it difficult to accurately use regulation adjustments to adjustment the amount of input power used by the first power supply 502.

As depicted, the power module 202 of the power balancing apparatus 110 measures the input power to the power supply 502 by way of the power meter 504. In one embodiment, power module 202 converts the measured input power to a digital power measurement signal and an average amount of input power per power supply 104 is determined. Based on a comparison of the digital power measurement signal to the determined average by the comparison module 208, the input power adjustment module 210 may adjust the input power of the power supply 502 by adjusting the voltage reference signal 516 provided to one of the primary stage controller 512 and secondary stage controller 514.

Adjustment of the voltage reference signal 516 results an adjustment of the output voltage Vout. If the output voltage Vout of a power supply 502 (power supplies 304 and 404 of FIGS. 3 and 4), is adjusted, the power supplied by the various power supplies 304, 404 to the load 106 will be adjusted. For example in the three-phase embodiment depicted in FIG. 4, if the output voltage Vout of a first power supply 404a is raised while the output voltage Vout of the second and third power supplies 404b,c remain the same, the power supplied by first power supply 404a to the load 106 will increase and the power supplied to the load 106 by the second and third power supplies 404b,c will decrease. This will in turn change the input power to the power supplies 404. In one embodiment, repeated adjustments are made to maintain the amount of input power of each of several power supplies 104 to be substantially equal to the average amount of power consumed per power supply 104.

Figure 6:
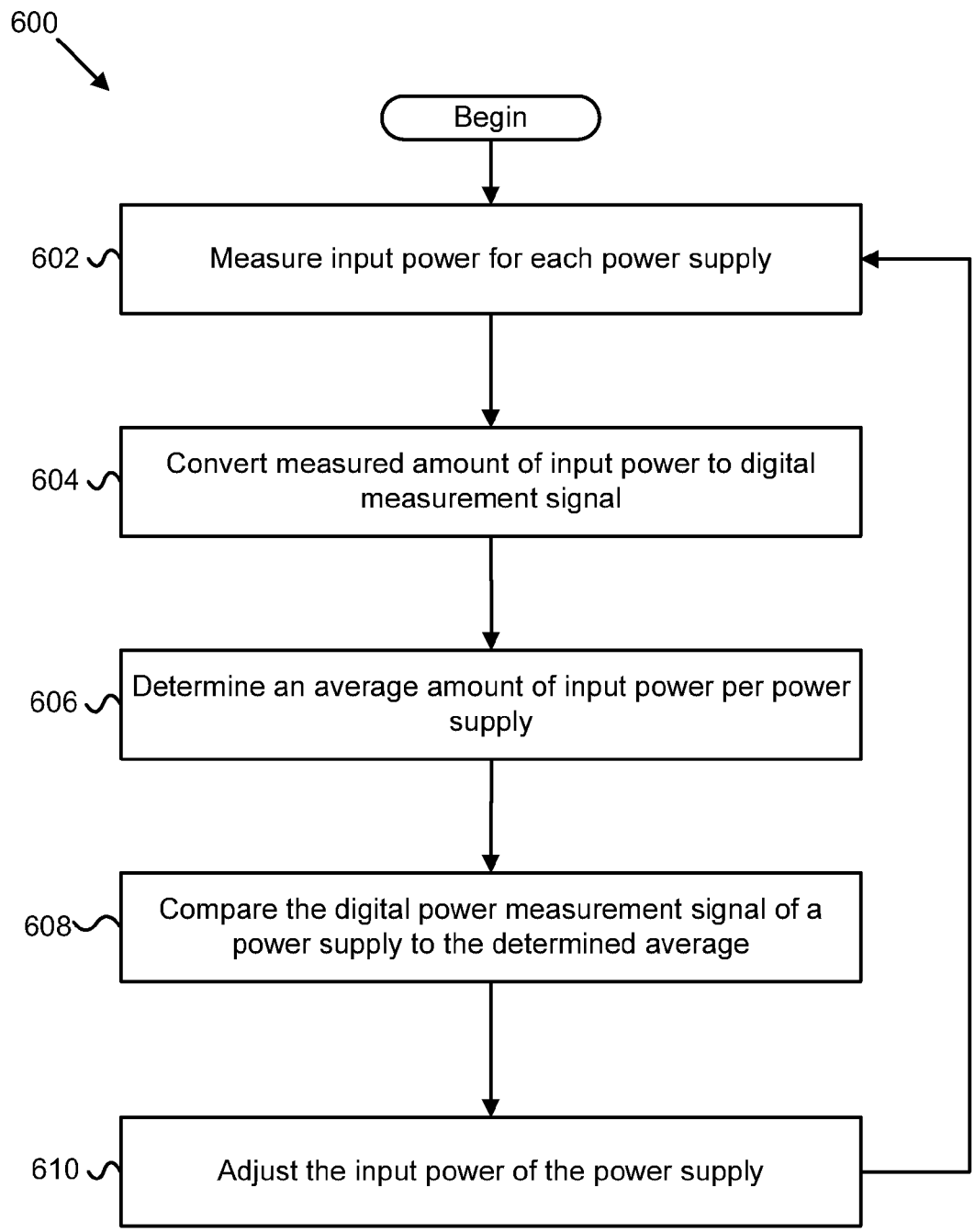
FIG. 6 is a schematic flow chart diagram illustrating one embodiment of a method for providing power balancing of power supplies in accordance with the present invention.

FIG. 6 is a schematic flow chart diagram illustrating one embodiment of a method 600 for providing power balancing of power supplies 104 in accordance with the present invention. The method in the disclosed embodiments substantially includes the steps necessary to carry out the functions and operations presented above with respect to FIGS. 1-5.

The method 600 begins when a power module 202 of a power balancing apparatus 110 measures 602 an amount of input power for each of a plurality of power supplies 104. Typically, the measurement is performed using an analog power meter or power monitor at the input to each power supply 104. Next, a conversion module 204 converts 604 the measured amount of input power of each power supply 104 to a digital power measurement signal. The digital power measurement signal may be generated by a digital-to-analog conversion device or module.

An averaging module 206 determines 606 an average amount of input power per power supply 104 based on a summation of the digital power measurement signal of each power supply 104. In one embodiment, determining the average may include dividing the summation of digital power measurement signals by the number of power supplies 104. In another embodiment, where the number of power supplies 104 is known or fixed, the summation itself may represent the determined average, and input power may be adjusted based on the summed value.

A comparison module 208 compares 608 the digital power measurement signal of a power supply 104 to the determined average amount of input power per power supply 104. An input power adjustment module 210 adjusts 610 the input power of the power supply 104 to cause the amount of input power of the power supply 104 to be substantially equal to the determined average amount of input power per power supply. In one embodiment, this includes adjusting a voltage reference signal used to regulate a voltage of the power supply 104.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to perform power balancing of power supplies, the apparatus comprising:
    a power module that measures an amount of input power for each of a plurality of switching power supplies, each switching power supply comprising a rectifier and at least one switching regulator stage, each switching power supply including an input line wherein the input line connects to an input side of the rectifier and an output side of the rectifier connects to the at least one switching regulator stage, the power module measuring an amount of input power for a switching power supply by measuring a current and a voltage on an input line to that switching power supply;
    a conversion module that converts the measured amount of input power of each switching power supply to a digital power measurement signal;
    an averaging module that determines an average amount of input power per switching power supply of the plurality of power supplies based on a summation of the digital power measurement signal of each switching power supply;
    a comparison module that compares the digital power measurement signal of a switching power supply of the plurality of switching power supplies to the determined average amount of input power per switching power supply of the plurality of switching power supplies; and
    an input power adjustment module that adjusts the input power of the switching power supply to cause the amount of input power of the switching power supply to be substantially equal to the determined average amount of input power per switching power supply, wherein for each switching power supply, the input power adjustment module adjusts the input power of the switching power supply by adjusting a voltage reference signal of the switching power supply, wherein the switching power supply adjusts an output voltage of the switching power supply based on the voltage reference signal.

2. The apparatus of claim 1, wherein each of the plurality of switching power supplies provides power to a common load.

3. The Apparatus of claim 1, wherein each of the plurality of switching power supplies receives power from a three-phase alternating current ("AC") power source, each phase of the three-phase AC power source supplying power to at least one of the plurality of power supplies.

4. The apparatus of claim 3, wherein the plurality of power supplies comprise three power supplies such that each power supply receives power from a distinct phase of the three-phase AC power source.

5. The apparatus of claim 3, wherein the plurality of power supplies are connected to the three-phase AC power source in a four wire wye configuration.

6. The apparatus of claim 3, wherein the plurality of power supplies are connected to the three-phase AC power source in a delta configuration.

7. The apparatus of claim 1, wherein the power module measures an amount of input power by measuring an amount of input power during two or more cycles of an AC input power signal.

8. The apparatus of claim 1, wherein each power supply of the plurality of power supplies comprises a primary switching regulator stage and a secondary switching regulator stage, wherein the input power adjustment module adjusts the input power of the power supply by adjusting a voltage reference signal that regulates an output voltage of the power supply.

9. The apparatus of claim 8, wherein the average amount of power per power supply is determined by dividing the summation of the digital power measurement signal of each power supply by the number of power supplies in the plurality of power supplies.

10. The apparatus of claim 1, wherein the digital power measurement signal is comprised of a number of bits in the range of about eight bits to about thirty-two bits.

11. The apparatus of claim 1, wherein the comparison module compares the digital power measurement signal of the power supply to the determined average amount of input power per power supply by subtracting the digital power measurement signal of the power supply from the determined average amount of input power per supply.

12. The apparatus of claim 1, wherein the input power adjustment module adjusts the input power of each power supply of the plurality of power supplies to cause the amount of input power for each power supply to be substantially equal to the determined average amount of input power per power supply.

13. A system to perform power balancing of power supplies, the system comprising:
a plurality of switching power supplies, each switching power supply comprising a rectifier and at least one switching regulator stage; and
a power balancing apparatus comprising:
a power module that measures an amount of input power for each of a plurality of switching power supplies, each switching power supply including an input line wherein the input line connects to an input side of the rectifier and an output side of the rectifier connects to the at least one switching regulator stage, the power module measuring an amount of input power for a switching power supply by measuring a current and a voltage on an input line to that switching power supply;
a conversion module that converts the measured amount of input power of each power supply to a digital power measurement signal;
an averaging module that determines an average amount of input power per power supply of the plurality of power supplies based on a summation of the digital power measurement signal of each power supply;
a comparison module that compares the digital power measurement signal of a power supply of the plurality of power supplies to the determined average amount of input power per power supply of the plurality of power supplies; and
an input power adjustment module that adjusts the input power of the power supply to cause the amount of input power of the power supply to be substantially equal to the determined average amount of input power per power supply,
wherein the input power adjustment module adjusts the input power of the power supply by adjusting a voltage reference signal of the power supply, the voltage reference signal of the power supply controlling an output voltage of the power supply.

14. The system of claim 13, further comprising one or more electronic devices that receive power from the plurality of switching power supplies.

15. A method for performing power balancing of power supplies, the method comprising:
measuring an amount of input power for each of a plurality of switching power supplies, each switching power supply comprising a rectifier and at least one switching regulator stage, each switching power supply including an input line wherein the input line connects to an input side of the rectifier and an output side of the rectifier connects to the at least one switching regulator stage, the power module measuring an amount of input power for a switching power supply by measuring a current and a voltage on an input line to that switching power supply;
converting the measured amount of input power of each power supply to a digital power measurement signal;
determining an average amount of input power per power supply of the plurality of power supplies based on a summation of the digital power measurement signal of each power supply;
comparing the digital power measurement signal of a power supply of the plurality of power supplies to the determined average amount of input power per power supply of the plurality of power supplies; and
adjusting the input power of the power supply to cause the amount of input power of the power supply to be substantially equal to the determined average amount of input power per power supply,
wherein adjusting the input power of the power supply comprises adjusting a voltage reference signal of the power supply, the voltage reference signal of the power supply controlling an output voltage of the power supply.

* * * * *